UNITED STATES PATENT OFFICE.

WILLIAM RIESS, SR., OF READING, PENNSYLVANIA.

MANUFACTURING OF SHEET-IRON.

Specification forming part of Letters Patent No. 33,214, dated September 3, 1861.

*To all whom it may concern:*

Be it known that I, WILLIAM RIESS, Sr., of Reading, in the county of Berks, in the State of Pennsylvania, have invented a new and useful Improvement in the Mode of Manufacturing Sheet-Iron, producing an article equal to the best Russia sheet-iron in luster and in its capability of resisting dampness or heat and of receiving acute bends without injury to its glossy surface, and which can be furnished for public use materially cheaper than the imported article, and which I have termed "Adamantine Iron" in order to distinguish it from the Russian and every kind of American sheet-iron, of which the following is a specification.

To enable others skilled in the art to make and use my invention, I will now proceed to describe my improved mode of manufacturing sheet-iron in a full and accurate manner.

I take bloom-iron plates and have them rolled in the usual manner until their thickness is reduced to No. 22. I prepare in a vat of sufficient dimensions a mixture of equal parts, by weight, of chalk, porcelain-clay, and graphite ground upon an ordinary paint-mill and diluted with water to the consistency of molasses. Into this mixture the still warm plates are dipped, but immediately withdrawn and put aside to dry. When dry they are packed eight to ten plates into a bundle and heated to a dark-red color in the usual manner for a continuation of the rolling process until reduced to the required thickness, and then tempered in an annealing-furnace. The effect produced by this mixture upon the plates is as follows: This coating equalizes and retains the heat, secures the plates from scorching, protects the surface of the plates from the influence of atmospheric air, effectually diminishing oxidation and the formation of scales, renders the plates free from cold-short, and consequently more tough when cold, and finally prepares them to yield quicker, easier, and more completely the dross upon their surface by the process next to be described.

Next to the above rolling and tempering process follows the cleaning of the plates and developing on their surface a layer of pure iron. For this operation are required three strong wooden boxes, each large enough to receive a number of plates, stood up edgewise and without coming into contact with each other. The first of these boxes is filled with a bath consisting of one part concentrated sulphuric acid and three parts of water. In this bath the plates are placed edgewise and without coming into contact with each other, and remain therein until they appear entirely free from scales. The second box contains a lye of one part potash diluted with twenty parts of water and filtered. The plates are removed from the first box into this lye and placed in the same erect edgewise position, so as not to come into contact with each other, there to remain until the testing-strip indicates that they have assumed a greenish-blue glossy tint, when they are removed into the third box, containing clear running water, for a thorough washing.

By the process above described the nature of the surface of the plates is greatly changed. The bath in the first box dissolves the coating in an exceedingly short time. The application of sulphuric acid is preferable to muriatic or nitric acid, because it generates no salt by coming into contact with the iron, and thus prevents a new oxidation on exposure to the influence of atmospheric air. The lye in the second box neutralizes the acid and checks its further action upon the iron, absorbing the acid and developing upon the surface a layer of fine porous iron. The running stream of pure water in the third box removes all remaining impurities. The plates, having been dried by the application of sawdust, are now placed vertically and about two inches apart into an oven, which must be heated with light dry wood—such as hemlock or white-pine—and provided with a crown of fire-bricks over the furnace, separating the heating-chamber from the latter, and perforated with numerous small holes for distribution from below. The fire is lighted after the oven has been charged with plates to its full capacity. The first result consists in the deposit of a light skin or layer of condensed smoke over the entire surface of the plates. With the increase of the heat and the consumption of the smoke this is carried off, and the plates assume a bluish-black glistening surface.

For the purpose of closely watching and controlling the operation, one or more of the sides of the oven are provided with suitable openings for the insertion of trying-strips. A careful examination of these testing-strips will show the gradual production of a carburet on the surface, which at first appears scaly, and may be scraped off with a knife. Soon, however, this carburet will be found to have embodied itself firmly with the iron, and is no longer removable in the above manner. From this period the heat must be checked and the plates allowed gradually to cool. When the plates are removed from the oven their surface will be very sensitive to the action of a blow with a polished hammer, or to the pressure between polished rolls, and it is to this polishing process to which the plates are next subjected.

The rolling, whenever found preferable, should be done by means of highly-polished rolls of steel, such as are used for rolling out copper, silver, or sheet steel. The hammering is best accomplished by means of a first or fore hammer and a polishing-hammer, both of which should be light—say thirty or forty pounds—and striking rapid blows, both the hammer and anvil being highly polished. The plate is worked under these hammers until its entire surface is evenly glazed and free from porous dull places, which operation is surprisingly expedited by the preceding treatment of the iron. The above cold rolling or hammering will necessarily close the fibers of the iron and make it harder and more elastic than desirable. It must therefore undergo the final operation of "tempering." This is accomplished in an oven similar in construction to that above mentioned, it being, however, important to line the entire tempering-chamber with plates of fire-bricks. This chamber, upon being charged with plates at intervals of about one inch, is tightly closed to exclude atmospheric air, whereupon the fire is kept up until the heat of the iron approaches the point at which it changes from a black to a dark-red color. This oven is, like the one above described, provided with openings for the insertion of trying-strips, as the progress of this tempering process requires careful watching to prevent any over-heating of the plates. The same will, upon removal from this tempering-oven, be found to have lost very little of their previous smoothness and polish, while they have gained the required pliability, and are now ready for the market. A subsequent passing of the plates, however, between polished rolls, or a final treatment with a light hammer, will very much heighten the polish and produce a decided improvement in the appearance of the iron.

By a slight change in the treatment of the plates subsequent to the herein-described cleaning process a much lighter and more silvery-gray-colored surface may be obtained. For this end the plates are, when dried, immediately polished after their removal from the water, and afterward tempered, like the bluish-black sheet-iron, with this difference, that at the beginning of the tempering process small quantities of rosin are injected into the chamber. This, by forming a heavier layer of condensed smoke on the plates, much preserves their former color, besides producing a peculiarly lustrous appearance of the surface.

Having thus described, according to the requirements of the law, and not by way of extending my claims for invention, the improved mode of manufacturing sheet-iron, I proceed now to state what I claim as my invention.

What I claim as my invention, and desire to secure by Letters Patent, is—

The new and improved process of manufacturing sheet-iron, as an entirety, consisting of the following subdivisions:

1. The mixture of equal parts, by weight, of chalk, porcelain-clay, and graphite diluted with water to the consistency of molasses, as described above, substantially in the manner and for the purpose specified.

2. The bath, consisting of one part concentrated sulphuric acid and three parts water, substantially in the manner and for the purpose specified.

3. The lye, consisting of one part potash diluted with twenty parts of water, substantially in the manner and for the purpose specified.

4. The method of producing a carburet on the surface of the plates, and of embodying the said carburet with the latter, substantially as and in the manner set forth in the specification.

WILLIAM RIESS, SEN.

Witnesses:
FRANK. B. MILLER,
THOMAS MORRIS.